(12) United States Patent
Menon et al.

(10) Patent No.: US 12,278,490 B2
(45) Date of Patent: Apr. 15, 2025

(54) POWER SYSTEM MEASUREMENT BASED MODEL CALIBRATION WITH ENHANCED OPTIMIZATION

(71) Applicant: GENERAL ELECTRIC COMPANY, Schenectady, NY (US)

(72) Inventors: Anup Menon, Somerville, MA (US); Chaitanya Ashok Baone, Arvada, CO (US); Honggang Wang, Clifton Park, NY (US); Mustafa Tekin Dokucu, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 728 days.

(21) Appl. No.: 17/288,617

(22) PCT Filed: Nov. 5, 2018

(86) PCT No.: PCT/US2018/059148
§ 371 (c)(1),
(2) Date: Apr. 26, 2021

(87) PCT Pub. No.: WO2020/096560
PCT Pub. Date: May 14, 2020

(65) Prior Publication Data
US 2021/0399546 A1 Dec. 23, 2021

(51) Int. Cl.
*H02J 3/00* (2006.01)
(52) U.S. Cl.
CPC ............ *H02J 3/004* (2020.01); *H02J 3/003* (2020.01)

(58) Field of Classification Search
USPC ....................................................... 700/291
See application file for complete search history.

(56) References Cited

U.S. PATENT DOCUMENTS

| 7,415,389 | B2 | 8/2008 | Stewart et al. |
| 8,126,685 | B2 | 2/2012 | Nasle |

(Continued)

FOREIGN PATENT DOCUMENTS

| CN | 103473401 A | 12/2013 |
| EP | 3336995 A1 | 6/2018 |

(Continued)

OTHER PUBLICATIONS

Bacaud, Léonard, et al. "Bundle methods in stochastic optimal power management: A disaggregated approach using preconditioners." Computational Optimization and Applications 20 (2001): 227-244. (Year: 2001).*

(Continued)

*Primary Examiner* — Mohammad Ali
*Assistant Examiner* — Joshua T Sanders
(74) *Attorney, Agent, or Firm* — Buckley, Maschoff & Talwalkar LLC

(57) ABSTRACT

A dynamic simulation engine, having system parameters, may be provided for a component of an electrical power system (e.g., a generator, wind turbine, etc.). A model parameter tuning engine may receive, from a measurement data store, measurement data measured by an electrical (Continued)

power system measurement unit (e.g., a phasor measurement unit or digital fault recorder measuring a disturbance event). The model parameter tuning engine may then pre-condition the measurement data and set-up an optimization problem based on a result of the pre-conditioning. The system parameters of the dynamic simulation engine may be determined by solving the optimization problem with an iterative method until at least one convergence criteria is met. According to some embodiments, solving the optimization problem includes a Jacobian approximation that does not call the dynamic simulation engine if an improvement of residual meets a pre-defined criteria.

15 Claims, 14 Drawing Sheets

(56) References Cited

U.S. PATENT DOCUMENTS

| | | | |
|---|---|---|---|
| 8,229,722 | B2 | 7/2012 | Nasle |
| 9,645,558 | B2 | 5/2017 | Shokooh et al. |
| 9,864,820 | B2 | 1/2018 | Shokooh et al. |
| 9,910,102 | B2 | 3/2018 | Stoupis et al. |
| 2005/0137834 | A1 | 6/2005 | Heydt et al. |
| 2012/0191439 | A1 | 7/2012 | Meagher et al. |
| 2014/0049109 | A1* | 2/2014 | Kearns ............ G05F 1/66 307/52 |
| 2014/0172125 | A1 | 6/2014 | Shokooh et al. |
| 2015/0100282 | A1 | 4/2015 | Shokooh et al. |
| 2015/0149128 | A1 | 5/2015 | Baone et al. |
| 2016/0154041 | A1 | 6/2016 | Bi et al. |
| 2016/0246904 | A1 | 8/2016 | Meagher et al. |
| 2016/0313197 | A1* | 10/2016 | Acharya .......... G01L 3/00 |
| 2017/0091791 | A1* | 3/2017 | Srinivasan ........ G06N 5/04 |
| 2019/0250571 | A1* | 8/2019 | Quirynen ......... G06F 17/16 |

FOREIGN PATENT DOCUMENTS

| | | |
|---|---|---|
| EP | 3364519 A1 | 8/2018 |
| KR | 20170028121 A | 3/2017 |

OTHER PUBLICATIONS

PMOD technologies—Analysis of Sensitivity and Identifiability; https://www.pmod.com/files/download/v31/doc/pkin/2242.htm (2013), retrieved from https://web.archive.org/web/20130331011949/https://www.pmod.com/files/download/v31/doc/pkin/2242.htm (Year: 2013).*

Menon, Anup, et al. "Towards a commercial-grade tool for disturbance-based model validation and calibration." 2018 IEEE Power & Energy Society General Meeting (PESGM). IEEE, 2018. (Year: 2018).*

Griensven et al., "A global sensitivity analysis tool for the parameters of multi-variable catchment models", Journal of Hydrology, vol. 324, Issues No. 1-4, pp. 10-23, Jun. 15 2006.

Tsai, "The PMU-based Parameter Identification for Synchronous Generator Dynamic Model", PhD Dissertation, The University of Texas, Arlington, Dec. 2011.

Huang et al., "Generator dynamic model validation and parameter calibration using phasor measurements at the point of connection", IEEE Transactions on Power Systems, vol. 28, Issue No. 2, May 2013.

Hajnoroozi et al., "Generating Unit Model Validation and Calibration Through Synchrophasor Measurements", IEEE Transactions on Smart Grid, vol. 6, Issue: 1, Jan. 2015.

Zhang et al., "Dependency Analysis and Improved Parameter Estimation for Dynamic Composite Load Modeling", IEEE Transactions on Power Systems, vol. 32, Issue: 4, Jul. 2017.

Scacchioli et al: "Model-Based Diagnosis of an Automotive Electric Power Generation and Storage System", pp. 72-85 vol. 44 Issue: Jan. 1, 2014.

International Search Report and Written Opinion dated Feb. 18, 2019 which was issued in connection with PCT Application No. PCT/US2018/059148 which was filed on Nov. 5, 2018.

Pourbeik et al.: "Semi-Automated Model Validation of Power Plant Equipment Using On-Line Measurements", IEEE Transactions on Energy Conversion, pp. 1-9, Jun. 2013.

Parrilla et al.: "A Computer-Based System for Validation of Thermal Models for Multichip Power Modules", Proceedings of IEEE Workshop on Computers in Power Electronics, Jun. 3-4, 2002.

Gotseff et al.: "Data-Driven Residential Load Modelling and Validation in Grid LAB-D", Ninth Annual IEEE Green Technologies Conference (GreenTech)m Mar. 29-31, 2017.

* cited by examiner

| COMPONENT IDENTIFIER 1402 | COMPONENT DESCRIPTION 1404 | DYNAMIC SIMULATION ENGINE IDENTIFIER 1406 | PMU AND DFR DISTURBANCE DATA 1408 | PRE-CONDITIONED DATA 1410 | OPTIMIZATION PROBLEM 1412 | SYSTEM PARAMETERS 1414 |
|---|---|---|---|---|---|---|
| C_1001 | GENERATOR | DSE_101 | | | | |
| C_1002 | WIND TURBINE | DSE_102 | | | | |
| C_1003 | GENERATOR | DSE_103 | | | | |
| C_1004 | SOLAR PANEL | DSE_104 | | | | |

POWER SYSTEM MEASUREMENT BASED MODEL CALIBRATION WITH ENHANCED OPTIMIZATION

GOVERNMENT SUPPORT

This invention was made with government support under DE-OE0000858 awarded by the U.S. Department of Energy ("DOE"). The government has certain rights in the invention.

BACKGROUND

Power system models are useful in providing critical analysis of power system stability. One conventional approach to the validation and/or calibration of a power system model is to disconnect the power system component of interest from the electric distribution grid for a temporary period. Disconnection of a power system component such as a power plant reduces the ability of the electrical distribution grid to provide sufficient power to meet demand in the most cost-effective manner Another conventional approach to validate and/or calibrate a power system model is to install one or more Phasor Measurement Units ("PMUs") into the electrical distribution grid at remote measurement points. The PMUs can measure characteristics of the electrical wave(s) present on the grid at these remote points. The captured measurements can be used to validate and/or calibrate the power system component model, without disconnecting the component from the grid. However, under this conventional approach, the model calibration results are only valid for a specific disturbance. There is no guarantee that for a subsequent disturbance the parameter values tuned using a previous disturbance are still valid. Moreover, the parameter identifiability studies are conducted around the default parameter values. A highly localized identifiability study can affect the performance of the validation/calibration algorithm used to tune the component of interest.

What is missing from the art is a validation/calibration algorithm to tune power system models, which leverages actual PMU measurement data to improve the model for multiple possible disturbances without the need to disconnect the power system component itself from the electrical distribution grid to perform the model calibration. It would therefore be desirable to provide non-invasive power system model validation and calibration for a wide variety of dynamic simulation engines in a fast, automatic, and accurate manner.

SUMMARY

According to some embodiments, a dynamic simulation engine (having system parameters) may be provided for a component of an electrical power system (e.g., a generator, wind turbine, etc.). A model parameter tuning engine may receive, from a measurement data store, measurement data measured by an electrical power system measurement unit (e.g., a phasor measurement unit or digital fault recorder). The model parameter tuning engine may then pre-condition the measurement data and set-up an optimization problem based on a result of the pre-conditioning. The system parameters of the dynamic simulation engine may be determined by solving the optimization problem with an iterative method until at least one convergence criteria is met. According to some embodiments, solving the optimization problem includes a Jacobian approximation that does not call the dynamic simulation engine if an improvement of residual meets a pre-defined criteria.

Some embodiments comprise: means for receiving, by a model parameter turning engine from a measurement data store, measurement data measured by an electrical power system measurement unit; means for receiving a model calibration command; means for pre-conditioning the measurement data; means for setting-up an optimization problem based on a result of the pre-conditioning; and means for determining system parameters, of a dynamic simulation engine for a component of the electrical power system, by solving the optimization problem with an iterative method until at least one convergence criteria is met.

Some embodiments are directed to a user interface which includes validation information, identifiability information, and calibration information. According to some embodiments, multiple event handling capability may be provided, multiple optimization goals (e.g., smart weight and faster iteration) may be supported, and/or multiple simulation engines may be modeled (e.g., a GE PSLF engine, a Powertech TSAT, a Siemens PPS/E).

Some technical advantages of some embodiments disclosed herein are improved systems and methods to provide non-invasive power system model validation and calibration for a wide variety of dynamic simulation engines in a fast, automatic, and accurate manner.

BRIEF DESCRIPTION OF THE DRAWINGS

FIG. 14 is portion of a tabular data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
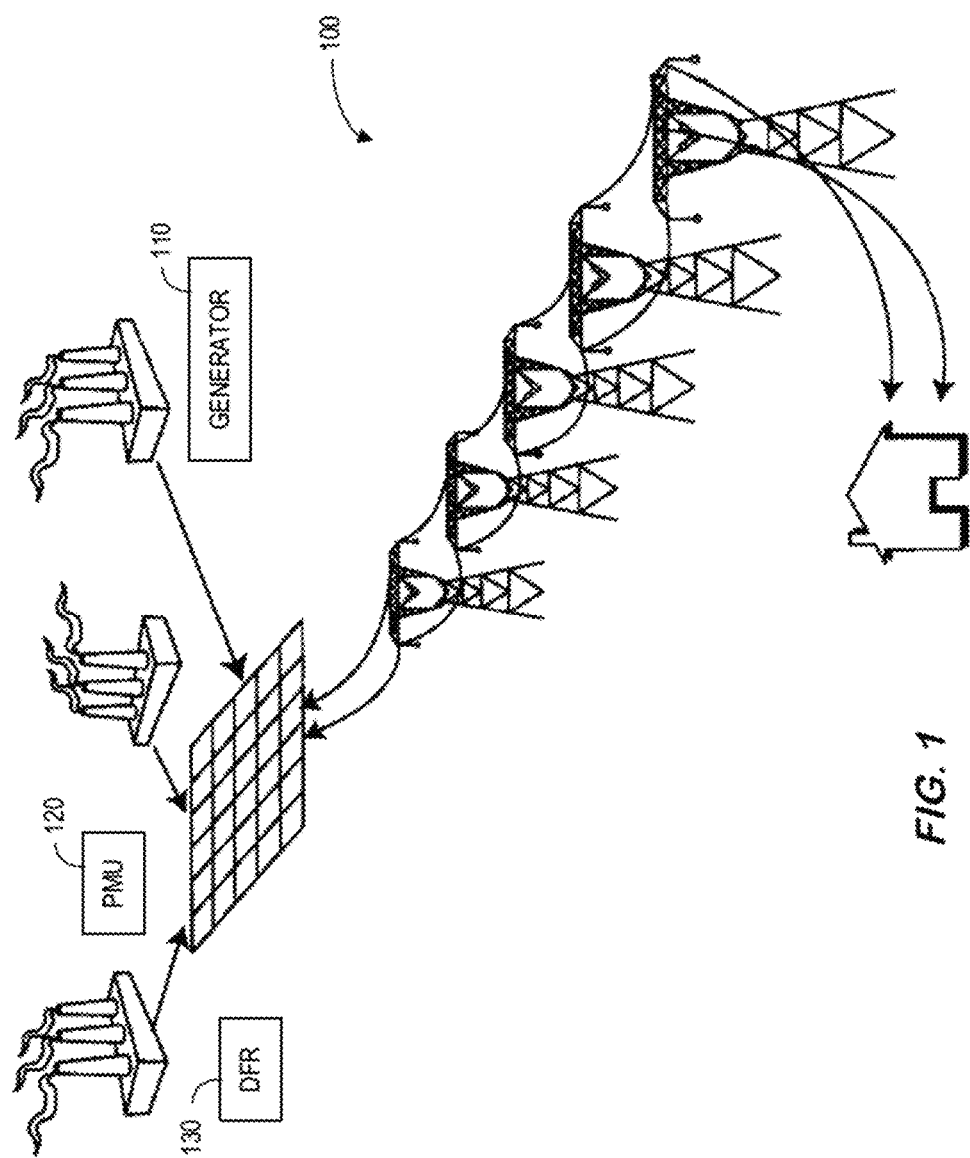
FIG. 1 illustrates a power distribution grid.

FIG. 1 illustrates a power distribution grid 100. The grid 100 includes a number of components, such as power generators 110. In some cases, planning studies conducted using dynamic models predict stable grid 100 operation, but the actual grid 100 may become unstable in a few minutes with severe swings (resulting in a massive blackout). To ensure that the models represent the real system accurately, the North American Electric Reliability Coordinator ("NERC") requires generators 110 above 10 MVA to be tested every five years to check the accuracy of dynamic models and let the power plant dynamic models be updated as necessary.

In a typical staged test, a generator 110 is first taken offline from normal operation. While the generator 110 is offline, testing equipment is connected to the generator 110 and its controllers to perform a series of pre-designed tests to derive the desired model parameters. This method may cost from $15,000 to $35,000 per generator 100 per test in the United States. Recently, PMUs 120 and Digital Fault Recorders ("DFRs") 130 have seen dramatic increasing installation in recent years, which may allow for non-invasive model validation by using the sub-second-resolution dynamic data. Varying types of disturbances across locations in the grid 100 along with the large installed base of PMUs 120 may, according to some embodiments, make it possible to validate the dynamic models of the generators 110 frequently at different operating conditions. As recognized by DOE, there is a need for a production-grade software tool generic enough to be applicable to wide variety of models (traditional generating plant, wind, solar, dynamic load, etc. with minimal changes to existing simulation engines. Note that model calibration is a process that seek multiple (dozens or hundreds) of model parameters, which could suffer from local minimum and multiple solutions. There is need for an algorithm to enhance the quality of a solution within a reasonable amount time and computation burdens.

Figure 2:
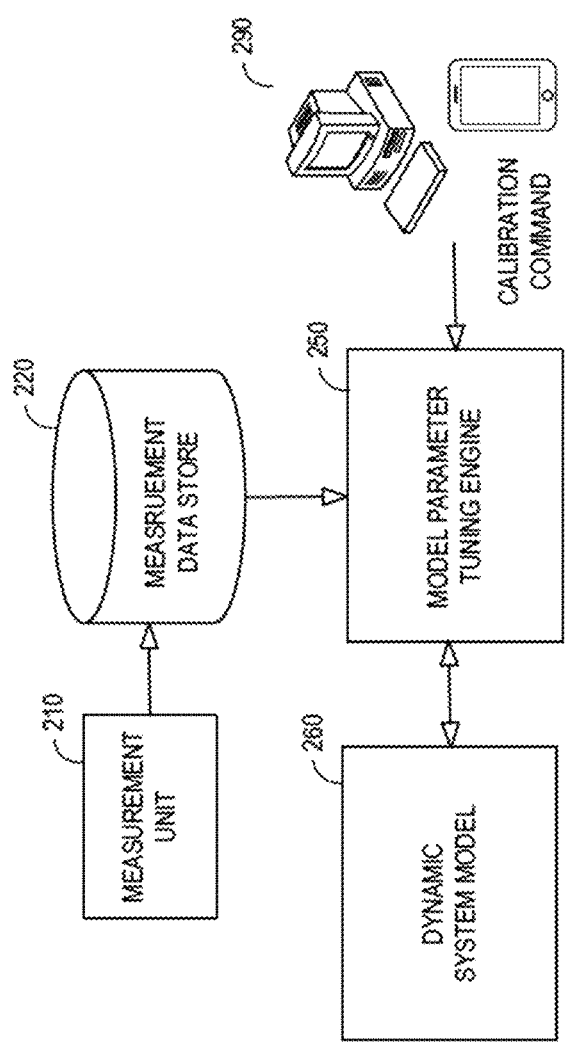
FIG. 2 is a high-level block diagram of a system in accordance with some embodiments.

To achieve such results, FIG. 2 is a high-level block diagram of a system 200 in accordance with some embodiments. The system 200 includes one or more measurement units 210 (e.g., PMUs, DFRs, or other devices to measure frequency, voltage, current, or power phasors) that store information into a measurement data store 220. As used herein, the term "PMU" might refer to, for example, a device used to estimate the magnitude and phase angle of an electrical phasor quantity like voltage or current in an electricity grid using a common time source for synchronization. The term "DFR" might refer to, for example, an Intelligent Electronic Device ("IED") that can be installed in a remote location, and acts as a termination point for field contacts. According to some embodiments, the measurement data might be associated with disturbance event data and/or data from deliberately performed unit tests. According to some embodiments, a model parameter tuning engine 250 may access this data and use it to tune parameters for a dynamic system model 260. The process might be performed automatically or be initiated via a calibration command from a remote operator interface device 290. As used herein, the term "automatically" may refer to, for example, actions that can be performed with little or no human intervention.

Note that power systems may be designed and operated using mathematical models that characterize the expected behavior of power plants, grid elements, and the grid as a whole. These models support decisions about what types of equipment to invest in, where to put it, and how to use it in second-to-second, minute-to-minute, hourly, daily, and long-term operations. When a generator, load, or other element of the system does not act in the way that its model predicts, the mismatch between reality and model-based expectations can degrade reliability and efficiency. Inaccurate models have contributed to a number of major North American power outages.

The behavior of power plants and electric grids may change over time and should be checked and updated to assure that they remain accurate. Engineers use the processes of validation and calibration to make sure that a model can accurately predict the behavior of the modeled object. Validation assures that the model accurately represents the operation of the real system—including model structure, correct assumptions, and that the output matches actual events. Once the model is validated, a calibration process may be used to make minor adjustments to the model and its parameters so that the model continues to provide accurate outputs. High-speed, time-synchronized data, collected using PMUs may facilitate model validation of the dynamic response to grid events. Grid operators may use, for example, PMU data recorded during normal plant operations and grid events to validate grid and power plant models quickly and at lower cost.

The transmission operators or Regional reliability coordinators, or Independent System Operators, like MISO, ISO-New England, PG&E, can use this calibrated generator or power system model for power system stability study based on N-k contingencies, in every 5 to 10 minutes. If there is stability issue (transient stability) for some specific contingency, the power flow will be redirected to relieve the stress-limiting factors. For example, the output of some power generators will be adjusted to redirect the power flow. Alternatively, adding more capacity (more power lines) to the existing system can be used to increase the transmission capacity.

With a model that accurately reflects oscillations and their causes, the grid operator can also diagnose the causes of operating events, such as wind-driven oscillations, and identify appropriate corrective measures before those oscillations spread to harm other assets or cause a loss of load.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP")

network such as the Internet, an intranet, or an extranet. Note that any devices described herein may communicate via one or more such communication networks.

The model parameter tuning engine 250 may store information into and/or retrieve information from various data stores, which may be locally stored or reside remote from the model parameter tuning engine 250. Although a single model parameter tuning engine 250 is shown in FIG. 2, any number of such devices may be included. Moreover, various devices described herein might be combined according to embodiments of the present invention. For example, in some embodiments, the measurement data store 220 and the model parameter tuning engine 250 might comprise a single apparatus. The system 200 functions may be performed by a constellation of networked apparatuses, such as in a distributed processing or cloud-based architecture.

A user may access the system 200 via the device 290 (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., when a new electrical power grid component is calibrated) and/or provide or receive automatically generated recommendations or results from the system 200.

Figure 3:
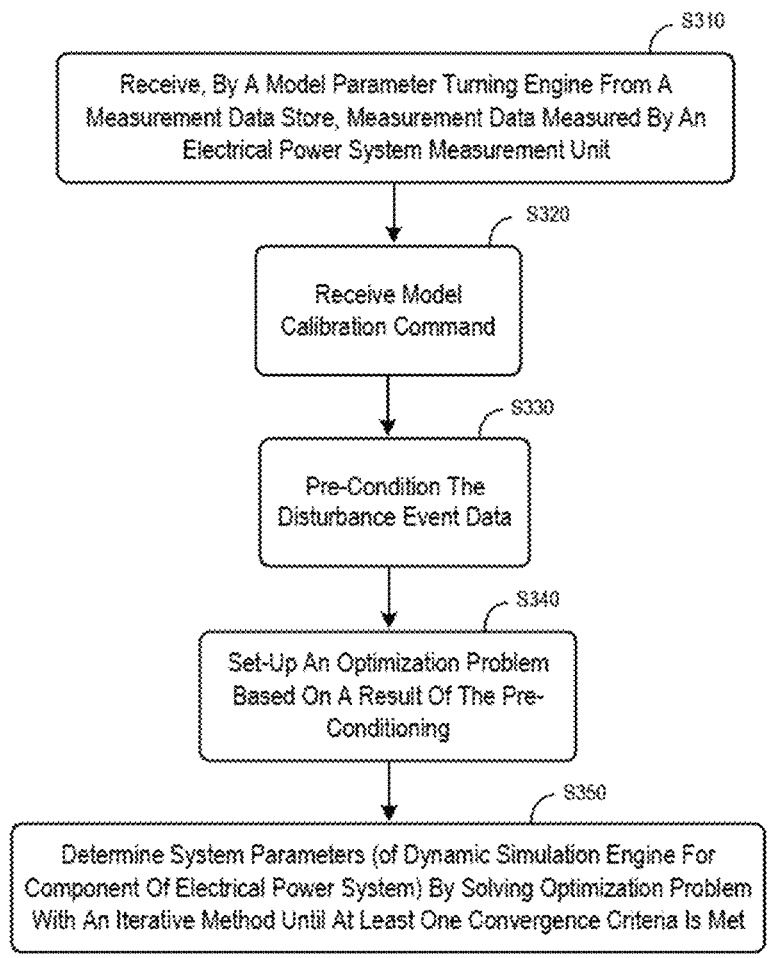
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a model parameter turning engine may receive, from a measurement data store, measurement data measured by an electrical power system measurement unit (e.g., a PMU, DFR, or other means of measuring frequency, voltage, current, or power phasors). The measurement data might be associated with, for example, disturbance event data, and/or data from deliberately performed unit tests. The disturbance data may be associated with a power grid electrical component. The electrical component might be associated with, for example, a generator, a wind turbine, a solar panel, a dynamic load, etc. The measurement data might include, according to some embodiments, device terminal real power ("P"), reactive power ("Q"), voltage magnitude ("V"), frequency ("f"), and/or phase angle data ("θ").

At S320, the system may receive a model calibration command. According to some embodiments, the calibration command is received via an automated process. According to other embodiments, the calibration command is received via a user console interface display. The interface display might, according to some embodiments (as described with respect to FIG. 9), provide for event data selection, simulation engine selection, and/or calibration algorithm configuration.

At S330, the system may pre-condition the measurement data. The pre-conditioning might include, for example, normalization of parameter and model output. The pre-conditioning might also include an identifiability assessment providing sensitivity and dependency. According to some embodiments, the pre-conditioning further includes a feature transformation on model output data. At S340, the system may set-up an optimization problem based on a result of the pre-conditioning.

At S350, the system may determine system parameters, of a dynamic simulation engine for the component of the electrical power system, by solving the optimization problem (set up at S340) with an iterative method until at least one convergence criteria is met. According to some embodiments, the optimization problem set-up includes a weight set-up on an objective function based on a feature transformation result. Note that solving the optimization problem might include sending model input and model parameters into the dynamic simulation engine and obtaining predicted model output for calculation of residual. Moreover, solving the optimization problem could include a Jacobian approximation (and the Jacobian approximation might not call the dynamic simulation engine if an improvement of residual meets a pre-defined criteria).

Figure 4:
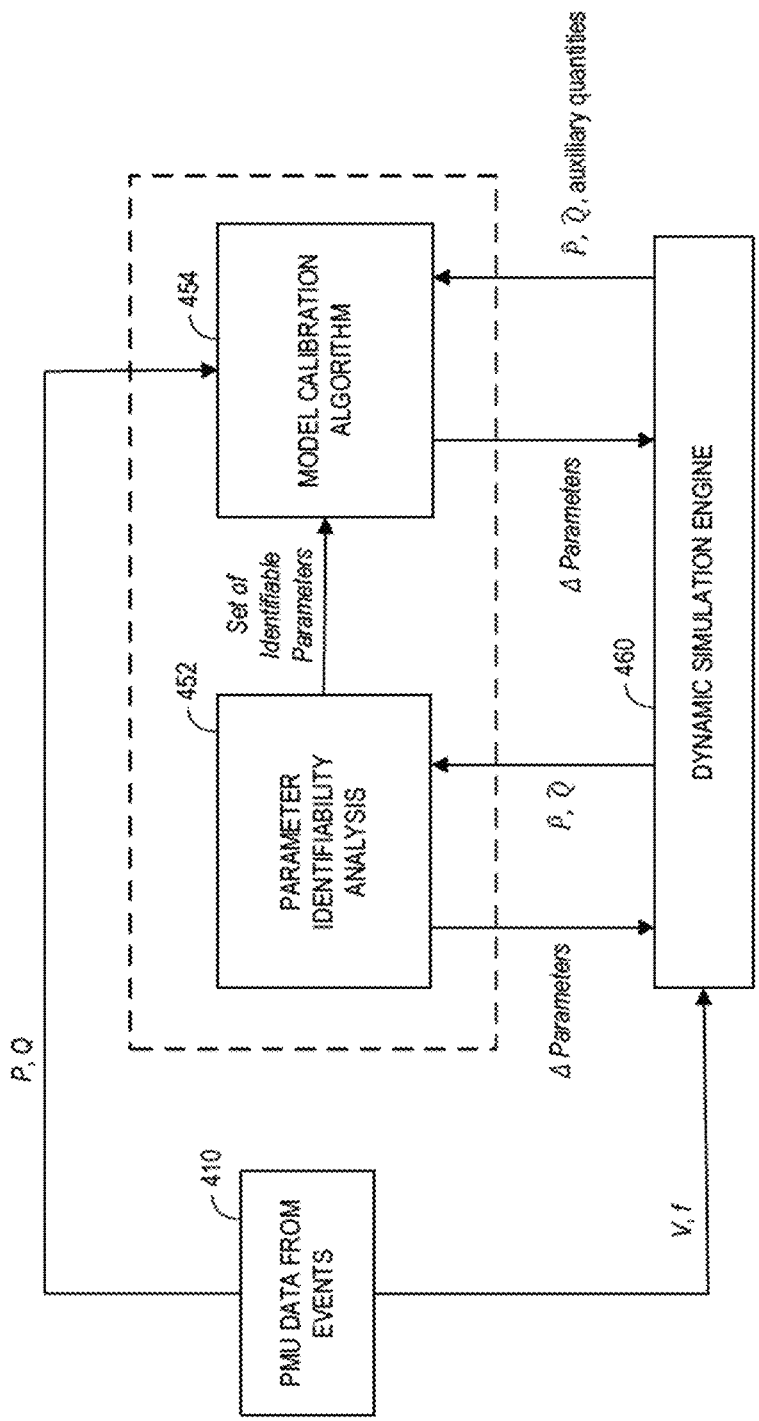
FIG. 4 is a block diagram of a system for power disturbance based model calibration in accordance with some embodiments.

FIG. 4 is a block diagram of a system 400 for power disturbance based model calibration in accordance with some embodiments. The system 400 includes a parameter identifiability analysis 452 that provides a set of identifiable parameters to a model calibration engine 454. The parameter identifiability analysis provides Δ parameters to a dynamic simulation engine 460 and receives back $\hat{P}$, $\hat{Q}$. The model calibration engine 454 also receives PMU data from disturbance events 410 (specifically, for example, P and Q). The model calibration algorithm 454, according to some embodiments, provides Δ parameters to the dynamic simulation engine 460 and receives back $\hat{P}$, $\hat{Q}$ along with auxiliary quantities. As will be described, this architecture may let disturbance events in a power grid be used to calibrate a power system model (e.g., the dynamic simulation engine) in a non-invasive way.

Figure 5:
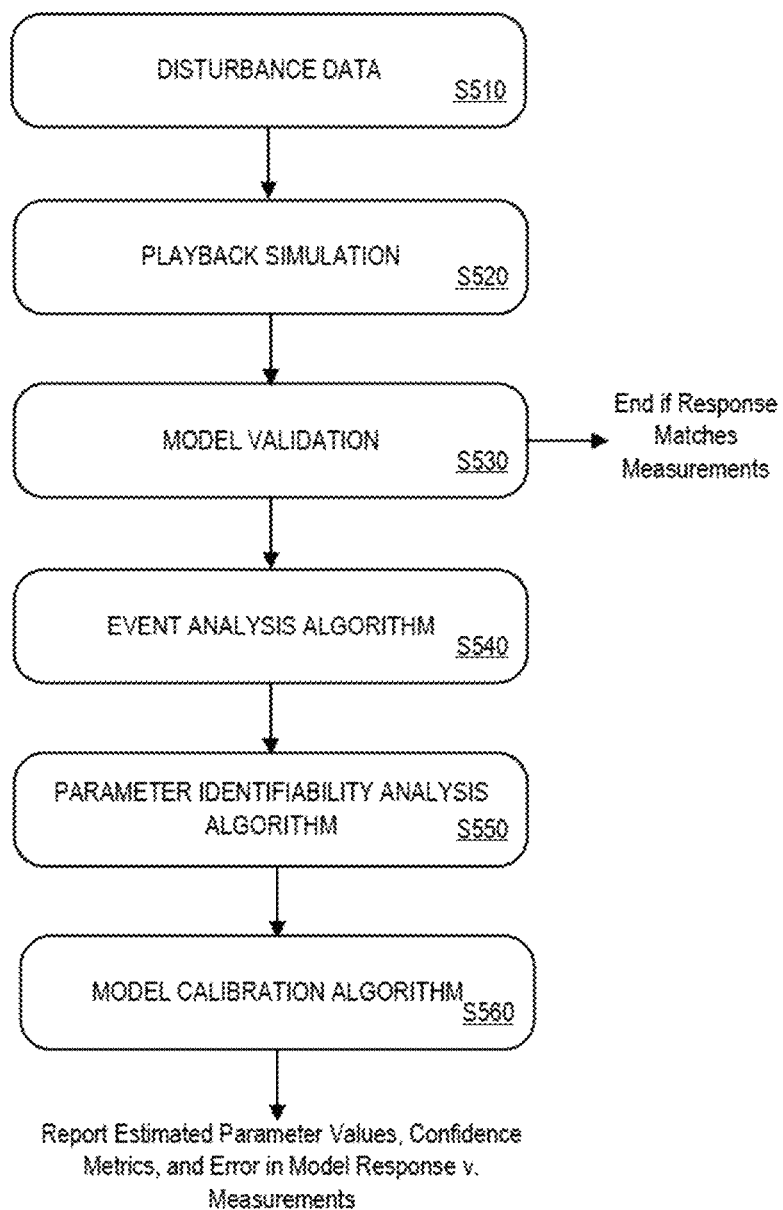
FIG. 5 is a general framework for power system model parameter conditioning according to some embodiments.

FIG. 5 is a general framework for power system model parameter conditioning according to some embodiments. At S510, disturbance data may be obtained (e.g., from a PMU or DFR) to obtain, for example, V, f, P, and Q measurement data at a Point Of Interest ("POI"). At S520, a playback simulation may run load model benchmarking using default model parameters (e.g., associated with a Positive Sequence Load Flow ("PSLF") or Transient Security Assessment Tool ("TSAT")). At S530, model validation may compare measurements to default model response. If the response matches the measurements, the framework may end (e.g., the existing model is sufficiently correct and does not need to be updated). At S540, an event analysis algorithm may determine if event is qualitatively different from previous events. At S550, a parameter identifiability analysis algorithm may determine most identifiable set of parameters across all events of interest. Finally, at S560 an Unscented Kalman Filter ("UKF")/optimization-based parameter estimation process may be performed. As a result, the estimated parameter values, confidence metrics, and error in model response (aa compared to measurements) may be reported.

Figure 6:
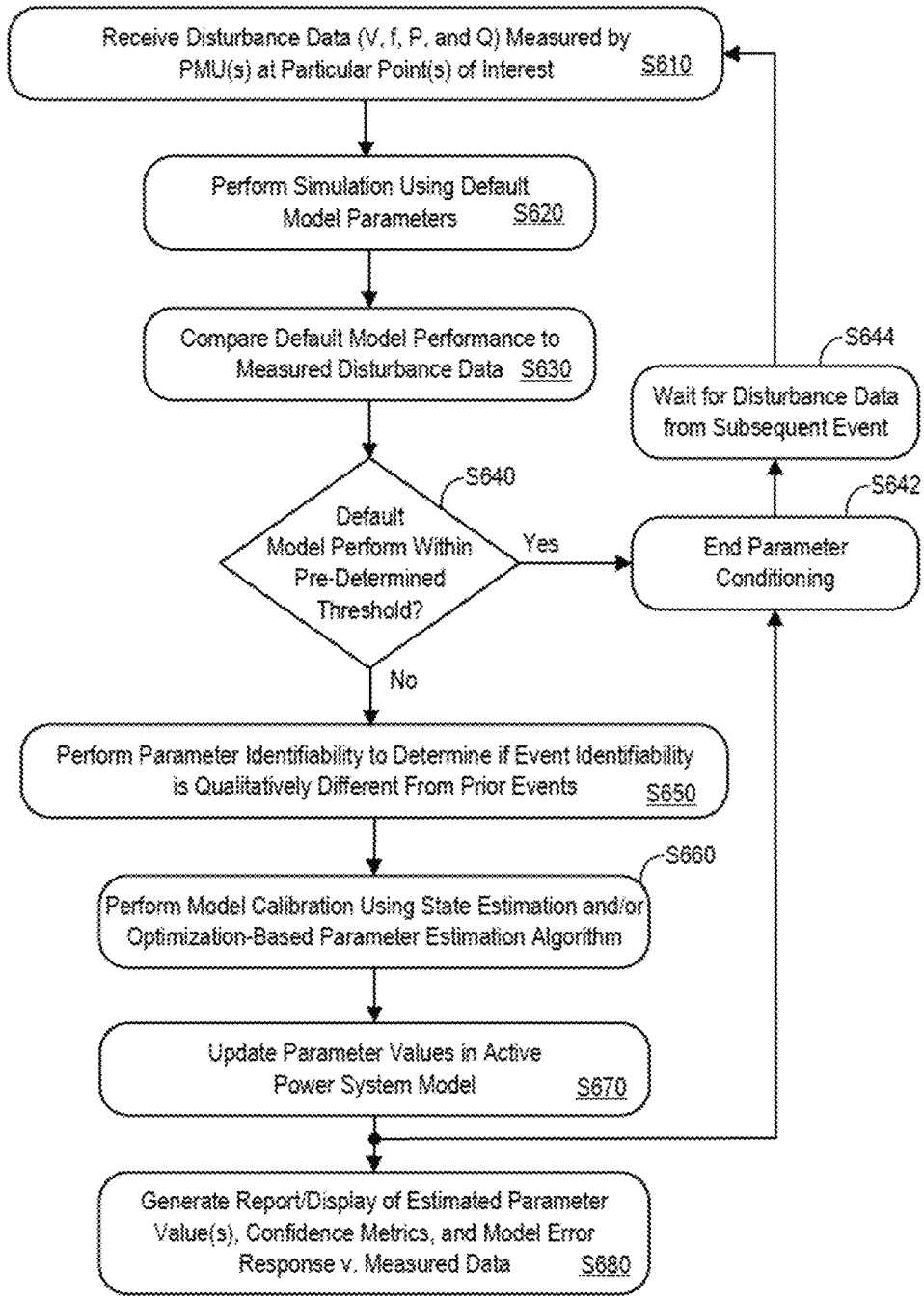
FIG. 6 is a method for a power system model parameter conditioning framework in accordance with some embodiments.

FIG. 6 is a method for a power system model parameter conditioning framework in accordance with some embodiments. At S610, disturbance data monitored by one or more PMUs coupled to an electrical power distribution grid may be received. The disturbance data can include voltage ("V"), frequency ("f"), and/or active and nonactive reactive ("P" and "Q") power measurements from one or more POI on the electrical power grid. A playback simulation using default model parameters can be performed at S620. These default parameters can be the current parameters incorporated in the power system model. The current parameters can be stored in a model parameter record. The simulation can be done by a model calibration unit, which can use a power system simulation engine to perform a real-time power system simulation scenario.

In accordance with some embodiments, the model calibration unit can implement model calibration with three functionalities. The first functionality is an event screening tool to select characteristics of disturbance event from a library of recorded event data. This functionality can simulate the power system responses when the power system is subjected to different disturbances. The second functionality is a preconditioning tool for the parameter identifiability study. When implementing this functionality, model calibration unit can simulate the response(s) of a power system model. The third functionality is a tool for simultaneous tuning of models using an augmented event comprised of multiple events.

In accordance with some embodiments, event screening can be implemented during the simulation to provide computational efficiency. If hundreds of events are stitched together and fed into the calibration algorithm unselectively, the algorithm may not be able to converge. To maintain the number of events manageable and still keep an acceptable representation of all the events, a screening procedure may be performed to select the most characteristic events among all. Depending on the type of events, the measurement data could have different characteristics. For example, if an event is a local oscillation, the oscillation frequency in the measurement data would be much faster as compared to an inter-area oscillation event. In some implementations, a K-medoids clustering algorithm can be utilized to group events with similar characteristic together, thus reducing the number of events to be calibrated.

The results of the simulated default model performance can be compared at S630 to actual disturbance data measured on the power system. If the default model performance is within (e.g., equal to or less than) a predetermined threshold of accuracy (e.g., specified by, for example, power system operators, designers, etc.) at S640, the process can end parameter conditioning at S642 and wait for disturbance data from a subsequent event at S644.

If the default model performance is outside of the predetermined threshold at S640, a parameter identifiability algorithm may be performed at S650. In accordance with some embodiments, the parameter identifiability analysis can determine the differing effects that various parameters can have on power system model. In some implementations, each parameter can represent a factor/coefficient in a term of a polynomial expression representing the power system model. To decide which parameters of the power system model are the best choice to tune, a parameter sensitivity study may be performed before model calibration at S660. The sensitivity study can vary the value of the parameter, compare the power system model result to monitored data, and then determine the perturbation's magnitude caused by the variation in parameter value.

To calculate the model's sensitivity to each parameter, playback simulation is conducted with the value of that parameter perturbed upward and downward. The difference in the model's performance (i.e., when compared to the measured disturbance data) between the up, and the down perturbation yields the trajectory sensitivity matrix.

In accordance with some embodiments, the parameter identifiability analysis addresses two aspects: (a) magnitude of sensitivity of output to parameter change; and (b) dependencies among different parameter sensitivities. For example, if the sensitivity magnitude of a particular parameter is low, the parameter would appear in a row being close to zero in the parameter estimation problem's Jacobian matrix. Also, if some of the parameter sensitivities have dependencies, it reflects that there is a linear dependence among the corresponding rows of the Jacobian. Both these scenarios lead to singularity of the Jacobian matrix, making the estimation problem infeasible. Therefore, it may be important to select parameters which are highly sensitive as well as result in no dependencies among parameter sensitivities. At S670, parameter values in the active power system model may be updated, and the system may generate a report and/or display of the estimated parameter values(s), confidence metrics, and the model error response as compared to the measured data at S680.

Figure 7:
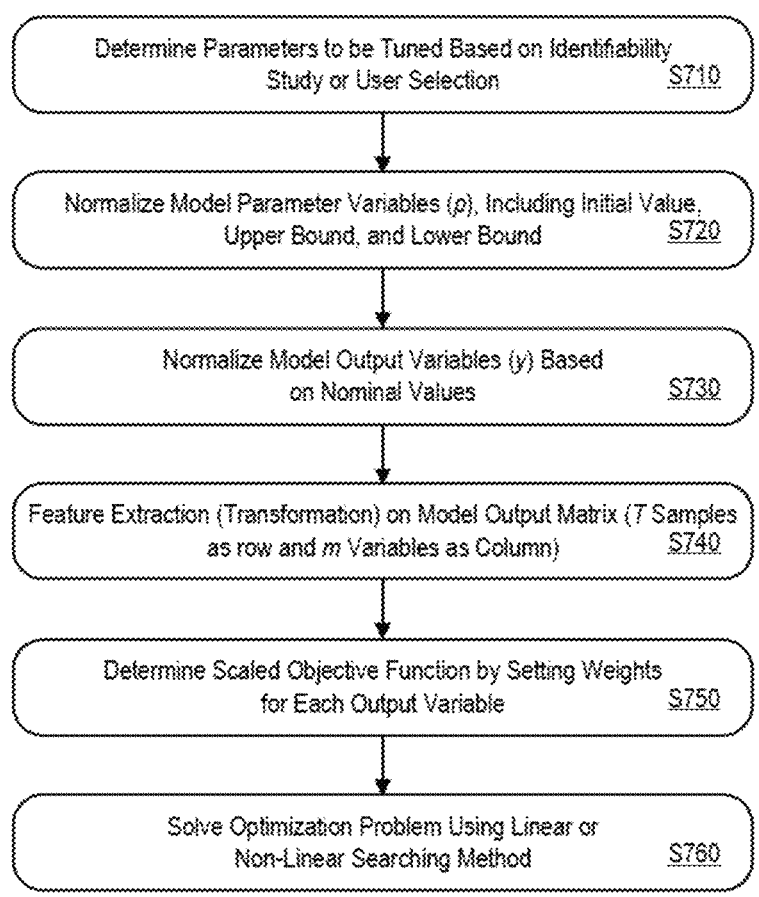
FIG. 7 is a flow chart of an optimization process for power system model parameter calibration according to some embodiments.

FIG. 7 is a flow chart of an optimization process for power system model parameter calibration according to some embodiments. The process of FIG. 7 can be considered a more detailed view of S660 of FIG. 6. At S710, the system may determine parameters to be tuned based on an identifiability study and/or (optional) user selection. At S720, the system may normalize model parameter variables (p), including an initial value, an upper bound, and a lower bound. At S730, the system may normalize model output variables (y) based on nominal values. At S740, the system may perform feature extraction (transformation) on a model output matrix (with t samples as rows and m variables as columns). One example of such an approach is a Principal Component Analysis ("PCA"). According to some embodiments, this can be implemented using $Y=Y_0 T$.

At S750, the system may determine a scaled objective function by setting weights for each output variable. According to some embodiments, the weight may be determined by feature extraction. This might be performed for example, using:

$$\min_{x_1 \leq x \leq x_u} \sum_{t=1}^{T} w_t \cdot \left( \frac{y_t^m - y_t(x)}{y_{base}} \right)^2$$

A typical objective function has a term for real power and a term for reactive power:

$$\min_{p} \|w_P E_P\|_2^2 + \|w_Q E_Q\|_2^2$$

where $E_P = P_{measured} - P_{model}(p)$ and $E_Q = Q_{measured} - Q_{model}(p)$ with weights $w_p$ and $w_Q$ determining how much importance is weighed upon real or reactive power. Significant effort is required to balance the two terms (i.e., adjusting the weights) to get a good match of real and reactive power. Instead, the two principal components of the data that to be matched may be found. Principal components may be determined on the scaled data (data−mean)/standard-deviation using the above mentioned Principal Component Analysis method. In this case, the objective function may become:

$$\min_{p} \|E_{PC1}\|_2^2 + \|E_{PC2}\|_2^2$$

where $E_{PC1} = PC1_{measured} - PC1_{model}(p)$ and $E_{PC2} = PC2_{measured} - PC2_{model}(p)$. In the end, both principal components of the data may be matched. The weights for the two terms may be, for example, 1 and the system might need no tuning/weighting of the objective function terms. The optimization problem for the parameter matching may be carried out in the latent variable space (i.e., an optimization problem may be projected and carried out in the principal component space). At S760, the system may solve an optimization problem using a linear or non-linear searching method.

Figure 8:
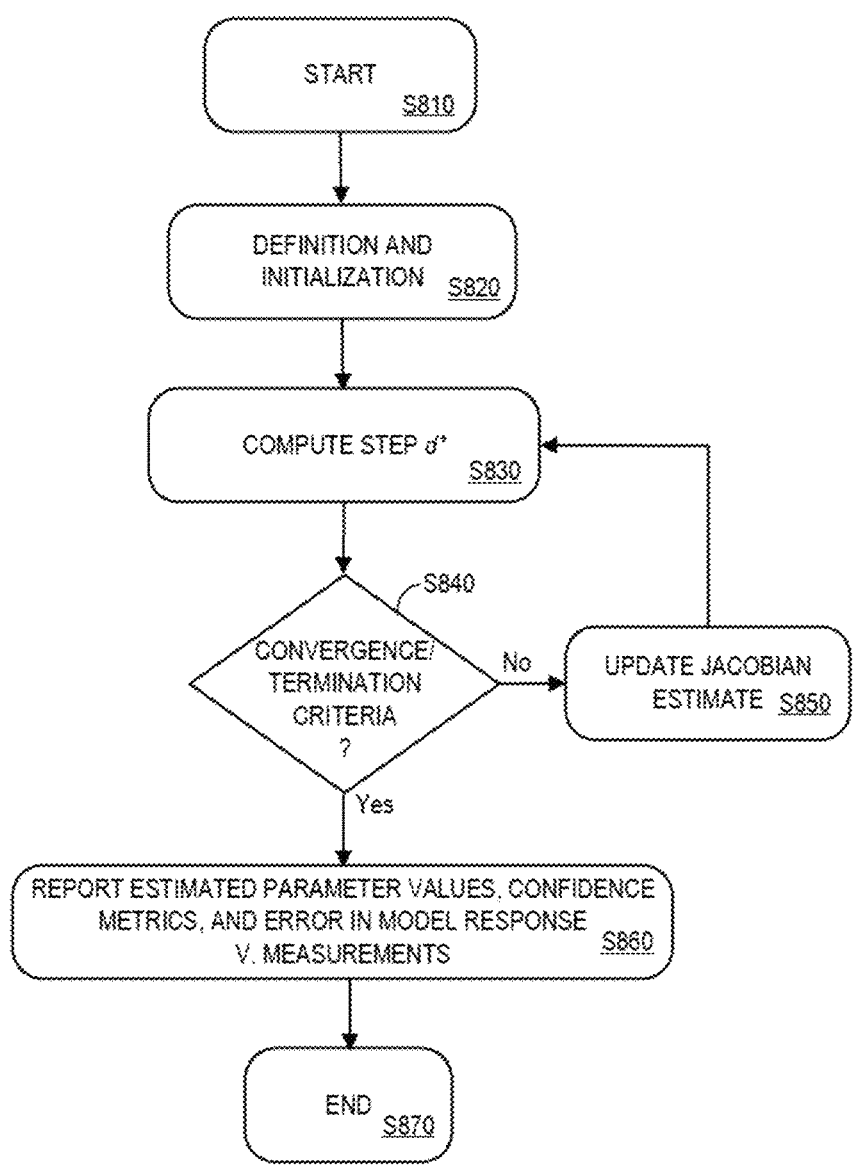
FIG. 8 is a flow chart of an optimization process illustrating the reuse of Jacobian information in accordance with some embodiments.

FIG. 8 is a flow chart of an optimization process illustrating the reuse of Jacobian information in accordance with some embodiments. After starting at S810, a definition and initialization process may be performed at S820. In particular, this process might involve a residual (nonlinear) function:

$$r(p)=y(p)-y^m$$

A Sum Of Squares ("SOS") objective:

$$\|r(p)\|_2^2$$

A quadratic model ("QM") of objective at $(p_k+d)$:

$$QM(J_k,r_k,d)=\|r(p_k)+J_kd\|_2^2=d^TJ_k^TJ_kd+2(J_k^Tr_k)^Td+r_k^Tr_k,$$

where Jacobian $$J_k = \frac{\partial r}{\partial p}\bigg|_{p_k}, r_k = r(p_k).$$

$r_k=r(p_k)$. Finally, the definition and initialization process S820 may initialize $p_0$, $B_0 \leftarrow J_0$, and trust region $\Delta$.

At S830, the system may compute step d* as follows. While $r(p_k) \leq r(p_k+d^*)$, do:

Find search direction by solving trust region sub-problem:

$$d^* = \underset{\|d\leq\Delta\|}{\operatorname{argmin}} QM(B_k, r_k, d)$$

If taking step $p_k \rightarrow p_k+d^*$:
  reduces $\|r(p)\|_2^2$ close to predicted by QM (QM valid for $\Delta$ neighborhood): increase $\Delta\uparrow$
  change in $\|r(p)\|_2^2$ is not as good as predicted by QM (QM not valid for $\Delta$ neighborhood):
  reduce $\Delta\downarrow$.

At S840, it is determined if there is convergence or that a termination criteria is met (that is, has there been a sufficient reduction in residual error?). If not, at S850 the Jacobian estimate can be updated. This may involve setting $p_{k+1} \leftarrow p_k+d^*$. In addition, if $\|r(p_{k+1})\|_2^2 << \|r(p_k)\|_2^2$ (sufficient reduction achieved) reasonable search direction, then continue with Broyden update:

$$B_{k+1} \leftarrow \text{Broyden}(B_k, r(p_k), r(p_{k+1}), d^*)$$

Else, there was an insufficient decrease, and to improve the search direction, the system may calculate the Jacobian as follows:

$B_k \leftarrow \text{eval\_Jacobian}(p_k)$ (which can be expensive in terms of time and computing resources)

If at S840 it is determined there is convergence or that the termination criteria is met Example of termination condition may include: the objective function value goes below a predefined threshold (like 0.001); the number of iterations goes above a predefined value (like 100); the number of function evaluation goes above a predefined value (like 2000), the system may report the estimated parameter values, confidence metrics, and the error in model response as compared to measurements at S860 and end at S870.

FIG. 8 describes a Gauss-Netwon Trust Region algorithm. S820 has definitions and initializations, S830 determines a step based on the trust region approach, and S850 provides the updated Jacobian information. One pass thru S820 and S850 is termed as an iterate. According to some embodiments, each model evaluation involves calling a standalone external solver that performs the play-back simulation. These calls are expensive, typically taking from 0.5 to 1 second to evaluate. If the system has 30 parameters to tune, about half a minute may be required just for a forward difference Jacobian call.

Thus, some embodiments may reduce the number of function evaluations, especially reducing the number of expensive Jacobian calls. To this end, the system may reuse the Jacobian between successive iterates is a natural option, i.e. reuse the last computed Jacobian in determining the step so long as such steps produce sufficient decrease in objective function.

A further refinement can be done by performing certain rank-one updates to improve the accuracy of the Jacobian along the iterates (as opposed to just reusing the last computed Jacobian). The implemented algorithm might, according to some embodiments, perform a Broyden rank-one update on the last computed Jacobian and use these for calculating the search direction until the resulting steps provide sufficient reduction in objective. These iterations may be termed as "inexact" since they are not based on the exact Jacobian. If the reduction in objective from inexact steps is insufficient, a computation of Jacobian at the current point may be trigged and an "exact" iteration follows.

Figure 9:
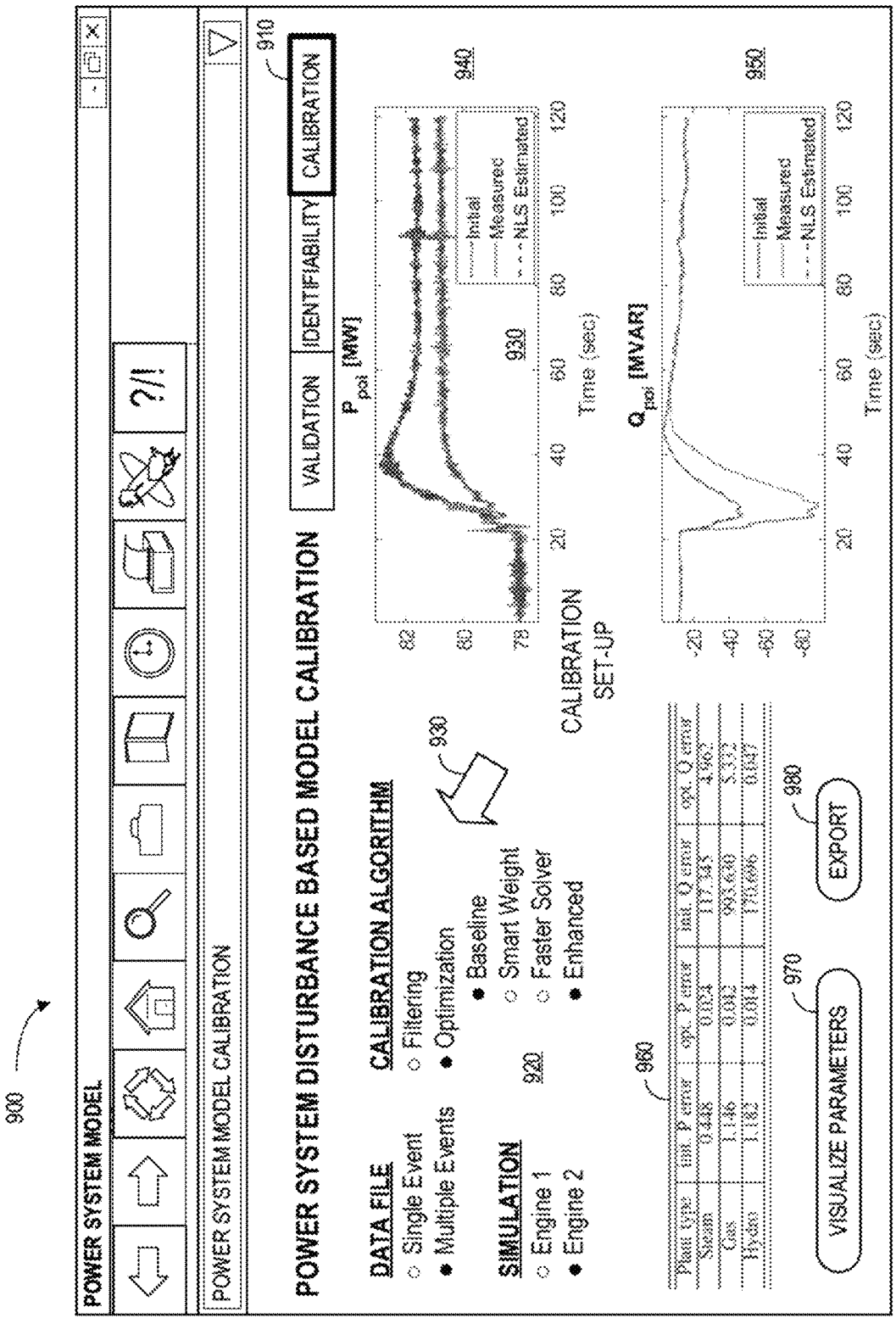
FIG. 9 is a human machine interface display in accordance with some embodiments.

FIG. 9 is a human machine interface display 900 in accordance with some embodiments. The display 900 includes user-selectable options of validation, identifiability, and calibration options 910. A customization area 920 allows for selection of a data file (e.g., associated with single or multiple events), a simulation, a calibration algorithm, etc. Selection of option (e.g., via touchscreen or computer mouse pointer 930) may result in the optimization criteria (e.g., a baseline approach, a smart weight, a faster solver, an enhanced version, etc.). The display may further include graphical charts 940, 950 that show a model response result figure according to the user selected options (e.g., with a percent improvement in accuracy and time marked on the charts 940, 950). The display 900 may also include a table 960 that shows performance in terms of deviation against measurement data, according to the user selected options, with a percentage improvement in accuracy and time included in the table 960. The may also be user-selectable graphical icons allowing a user to visualize parameters 970 and/or export 980 the data.

Figure 10:
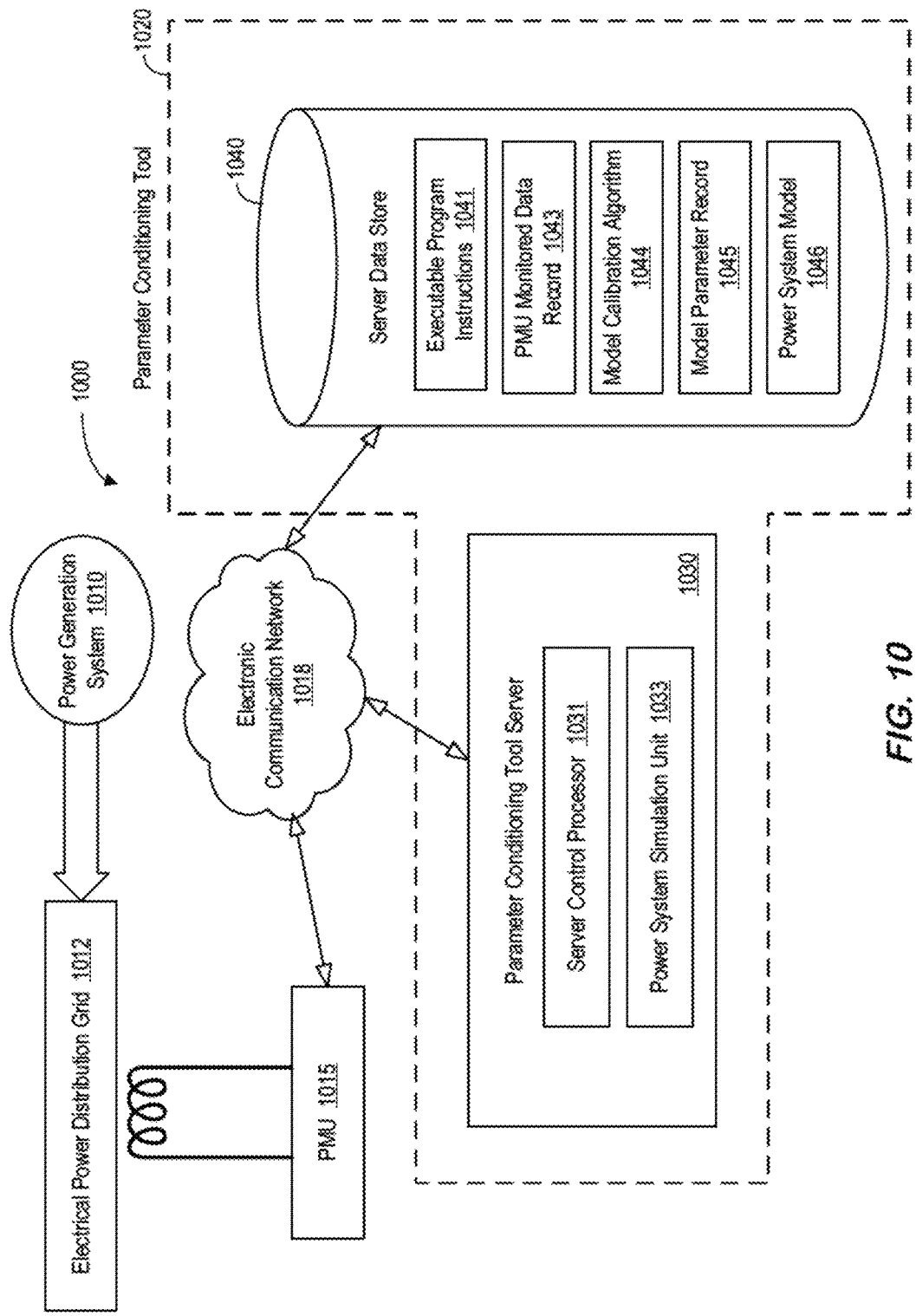
FIG. 10 depicts a system that includes a power system model parameter conditioning tool in accordance with some embodiments.

FIG. 10 depicts a system 1000 that includes a power system model parameter conditioning tool in accordance with some embodiments. Note that a conditioning tool can improve the accuracy of a power system model for various types of dynamic devices used as power generation systems (i.e., generation plants, renewable energy sources, control devices, dynamic loads, etc.). In accordance with some embodiments, high-fidelity disturbance measurement data obtained from PMUs for multiple disturbances can be leveraged to improve the power system model so that mandated grid reliability requirements can be met.

In accordance with some embodiments, a parameter conditioning tool 1020 performs analysis using PMU data from multiple disturbances. This conditioning analysis can identify the magnitude and dependency of device parameter sensitivities in a power system model. From the analysis, a set of power system model parameters impacted by one selected disturbance, or more, is passed to a model calibration algorithm. The set of parameters can include those model parameters that are most impacted by the particular selected disturbance(s) (i.e., causing the greatest degradation in power system model prediction performance). In accordance with some embodiments, a parametric sensitivity study can be conducted for differing types of disturbance to identify which parameters should be included in the set.

An embodying model calibration algorithm 1044 may tune these passed parameters of the power system model to make the outputs generated by the model more closely match the signals collected by the PMUs for the selected disturbances. In some implementations the generated outputs can be, for example, real and reactive power outputs. In accordance with some embodiments, the parameter tuning considers the effect of multiple disturbances to arrive at a global model validation/calibration to best fit a variety of disturbances. In accordance with some embodiments, a calibration step can tune parameters for multiple disturbances simultaneously.

Embodying approaches can account for non-linearity in the power system model; account for multiple differing disturbance events; and calibration results can be localized around assumed default parameter values. Physical constraints of parameters may be enforced during model calibration, and an embodying calibration algorithm avoids tuning model parameters that might already be set at their true (e.g., optimal) values. As shown in FIG. 10, a system 1000 may include a power system model parameter conditioning tool 1010 in accordance with some embodiments. An embodying parameter conditioning tool 1020 can include a parameter conditioning tool server 1030 in communication with a server data store 1040.

The server 1030 can include a server control processor 1031 that communicates with other components of the parameter conditioning tool 1020. A server control processor 1031 accesses computer executable program instructions 1041, which in some implementations can be stored in the server data store 1040. The server control processor 1031 can support embodying power system model parameter conditioning for disturbance-based model validation and or calibration by executing executable instructions 1041. Dedicated hardware, software modules, and/or firmware can implement embodying approaches disclosed herein.

The server 1030 can be in communication with the server data store 1040 directly and/or across an electronic communication network 1018. The electronic communication network 1018 can be, can comprise, or can be part of, an IP network, the Internet, an ISDN, frame relay connections, a modem connected to a phone line, a PSTN, a public or private data network, a LAN, a MAN, a WAN, a wireline or wireless network, a local, regional, or global communication network, an enterprise intranet, any combination of the preceding, and/or any other suitable communication means. It should be recognized that techniques and systems disclosed herein are not limited by the nature of electronic communication network 1018.

A power system can include a power generation system 1010, which provides electrical power to an electrical power distribution grid 1012. A PMU 1015 can be coupled to the electrical power distribution grid to monitor signal characteristics (e.g., voltage (V), frequency (f), active reactive power (P), and nonactive reactive power (Q)). The data obtained by the PMU 1015 can be provided to the parameter conditioning tool 1020 across the electronic communication network 1018. This data can be stored in data records PMU monitored data 1043. It should be readily understood that a power system is not limited to a single power generation system; that an electrical power grid can be a vast, interconnected network of multiple producers (power generation systems), transmission lines, substations, transformers, and loads (power consumers); and that multiple PMUs can be coupled to the power grid at multiple locations.

Under conventional approaches, a power system model is tuned ("calibrated") for one event (e.g., treating each disturbance event separately). This conventional approach results in severely limiting that model's performance to satisfactorily predict a power system's performance in response to a subsequent event. Because some embodiments described herein simultaneously perform power system parameter tuning across multiple events, these system parameters can be provided to a power system model 1046. By incorporating the tuned parameters into the power system model 1046, the model 1046 can more accurately predict power system performance than conventionally-calibrated ("tuned") models.

In accordance with some embodiments, the parameter conditioning tool 1020 generates trajectory sensitivity matrices for all the selected disturbances. These matrices are generated by perturbing each model parameter and feeding the perturbed parameter values to model simulation unit 1033. Depending on the number of disturbances being considered, model calibration algorithm 1044 can follow two options.

If the number of disturbances is large enough that the union of null spaces of the sensitivity matrices of all the disturbances has a rank higher than the parameter number, an embodying model calibration algorithm 1044 can solve an optimization problem to find a solution that has the minimum total distance to all the null spaces. The solution reflects the parameter set that has dependencies in one or more of these disturbances. Therefore, such a solution gives a comprehensive identifiability ranking of parameters across disturbances.

If the number of disturbances is small, a second option can be implemented by model calibration algorithm 1044. This second option evaluates the identifiability of parameters for each disturbance, then calculates the average identifiability ranking across disturbances. Since the sensitivity studies are conducted at the parameters' default values, the parameter conditioning tool can also perform a global sensitivity consistency study when the parameters' values deviate far away from their default values. Such study can portray the geometry of the parameter sensitivity in the entire parameter space.

Since different events may have different characteristics, the conventional identifiability analysis corresponding to each single event may not be applicable to other events. For example, a set of most-identifiable parameters for event A may not be identifiable for event B. Then, for a single event calibration, the value of this set of parameters is only tuned by a conventional approach to make the output match event A's measurement data. But when the tuned parameter values are used to simulate event B, there could still be discrepancy between simulation output from the power system model and measurement data from PMUs.

In accordance with some embodiments, because there is availability of measurement data from multiple events, a comprehensive identifiability study across multiple events can be performed. This comprehensive study can provide a most-identifiable parameter set for the simultaneous calibration of multiple disturbances. In accordance with some embodiments, this parameter set can be used to tune power system model 1046 to better match (when compared to conventionally-tuned power system models) the measurement data of multiple events simultaneously.

When a quantity of N events is considered, applying Singular-Value Decomposition ("SVD") analysis to the sensitivity trajectory matrices results in a quantity of null spaces equal to the value of N. The null space for one event also can be interpreted as a system of homogeneous algebraic equations with parameter sensitivities being the unknowns. Since the null space from one event has a rank lower than the number of parameters, the number of equations is less than the number of unknowns.

Considering more events is equivalent to adding more equations to the system. After the event number N exceeds a certain value (also the characteristic of events should be diverse), the system would have more equations than unknowns. In implementation, the numerical rank should be greater than the number of unknowns. The solution that minimizes the difference between the left and right hand of the equation system represents the comprehensive sensitivity magnitude of all parameters across all the considered events. For sensitivity dependency, accounting for the null spaces of all considered events, a comprehensive dependency index can also be calculated.

In accordance with some embodiments, if the number of events is not large enough to construct a null space with higher rank than the number of parameters, the identifiability for each single event is analyzed, and then the average identifiability can be uses as the identifiability across all events.

In accordance with some embodiments, the model calibration algorithm 1044 can implement an algorithm to perform a sensitivity dependency calculation using null space of the trajectory sensitivity matrix to calculate sensitivity dependency. The dependency index can be defined by counting the large elements in the right singular vectors in null space as follows:

```
procedure DEPENDENCY (NullSpace)
    M ← number of parameters
    N ← number of right singular vectors in null space
    for j ← 1, M do
        Dj ← 0
    end for
    for i ← 1, N do (Search for direct dependencies)
        for j ← 1, M do
            for k ← 1, M do
                if NullSpace(k, i) ≥ threshold then
                    Dj ← Dj ∪ k
                end if
            end for
        end for
    end for
    for j ← 1, M do
        L(j) ← | Dj|
    end for
    k ← 1
    for j ← 1, M do (Search for indirect dependencies)
        while k ≤ L(j) do
            Dindirect ← Dj \ DDj(k)
            if Dindirect ≠ 0 then
                Dj ← Dj ∪ Dindirect
                L(j) ← L(j) + |Dindirect|
            end if
            k ← k + 1
        end while
    end for
end procedure
```

According to some embodiments, a power system simulation engine can be represented by an Ordinary Differential Equation ("ODE") model:

$$\dot{x}=f(x,u,p)$$

$$y=h(x,p)$$

where x, u, p, and y are state, input, parameters, and outputs, respectively. In playback mode, recorded excitation or input data u such as voltage and frequency is played into an Ordinary Differential Equation ("ODE") or a Differential-Algebraic system of Equations ("DAE") model of the power system component and the model response or output y such as real and reactive power is to be computed. The problem is to seek a procedure to determine a set of parameters p such that the playback simulation of the model when excited with measured input data $u_m$, produces a simulated response that is close in some sense to the recorded response $y_m$.

Note that one typical approach is to treat the model parameters p as state variables so as to cast the problem as a standard nonlinear state estimation problem, where w is process noise that accounts for input noise and model mismatch, and v is the measurement noise:

$$\begin{pmatrix}p\\x\end{pmatrix}=\begin{pmatrix}0\\f(x,u,p)\end{pmatrix}+w$$

$$y=h(x,p)+v$$

To solve this nonlinear estimation problem, particle filtering, extended, ensemble and/or an unscented Kalman filter may be used. The main drawback to solve the joint parameter and state estimation problem is that it requires excessive information exchange with the simulation engine. This invasive requirement poses an engineering burden on the existing simulation engines by requiring them to alter established data flows. Furthermore, such changes may need to be made on a model-by-model basis, which would further multiply the already significant engineering effort needed in order to make a generic model calibration tool.

Figure 11:
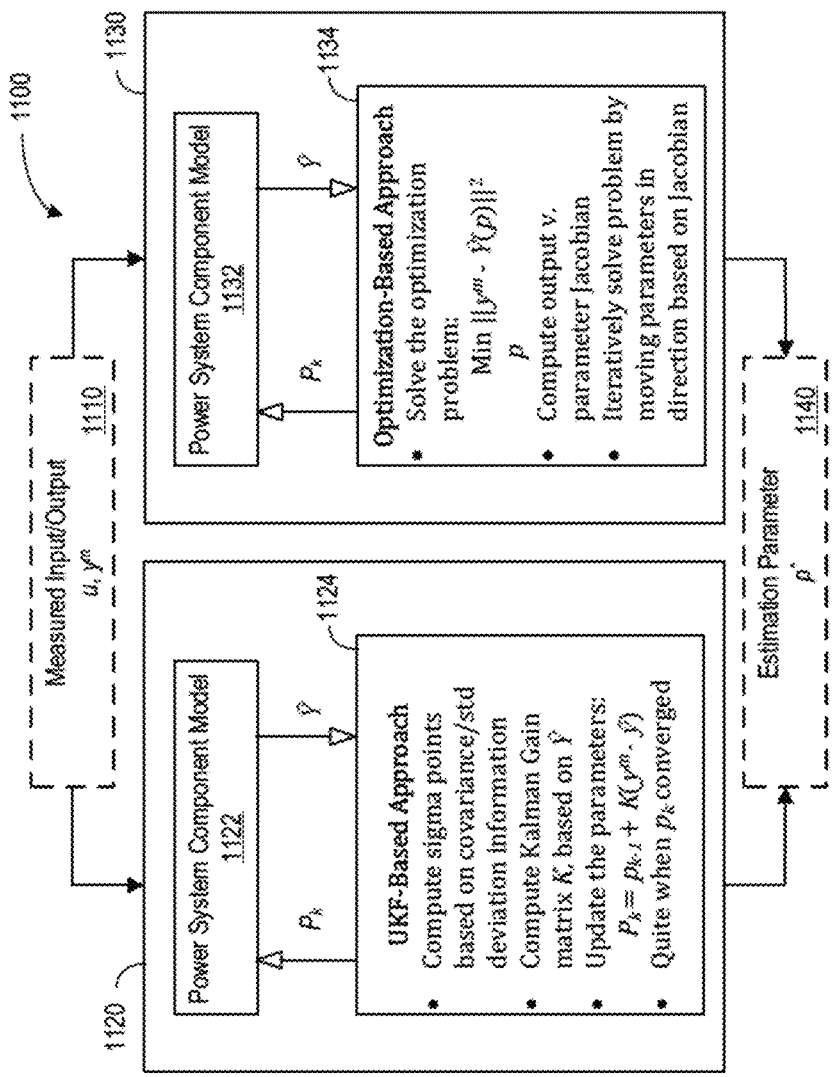
FIG. 11 illustrates candidate parameter estimation algorithms according to some embodiments.

FIG. 11 illustrates candidate parameter estimation algorithms 1100 according to some embodiments. In one approach 1120, measured input/output data 1110 (u, $y^m$) may be used by a power system component model 1122 and an UKF based approach 1124 to create an estimation parameter (p*) 1140.

In particular, the system may compute sigma points based on covariance and standard deviation information. The Kalman Gain matrix K may be computed based on $\hat{Y}$ and the parameters may be updated based on:

$$p_k=p_{k-1}+K(y^m-\hat{y})$$

until $p_k$ converges. According to another approach 1130, the measured input/output data 1110 (u, $y^m$) may be used by a power system component model 1132 and an optimization-based approach 1134 to create the estimation parameter (p*) 1140. In this case, the following optimization problem may be solved:

$$\min_p\|y^m-\hat{Y}(p)\|^2$$

The system may then compute output as compared to parameter Jacobian information and iteratively solve the above optimization problem by moving parameters in directions indicated by the Jacobian information.

Figure 12:
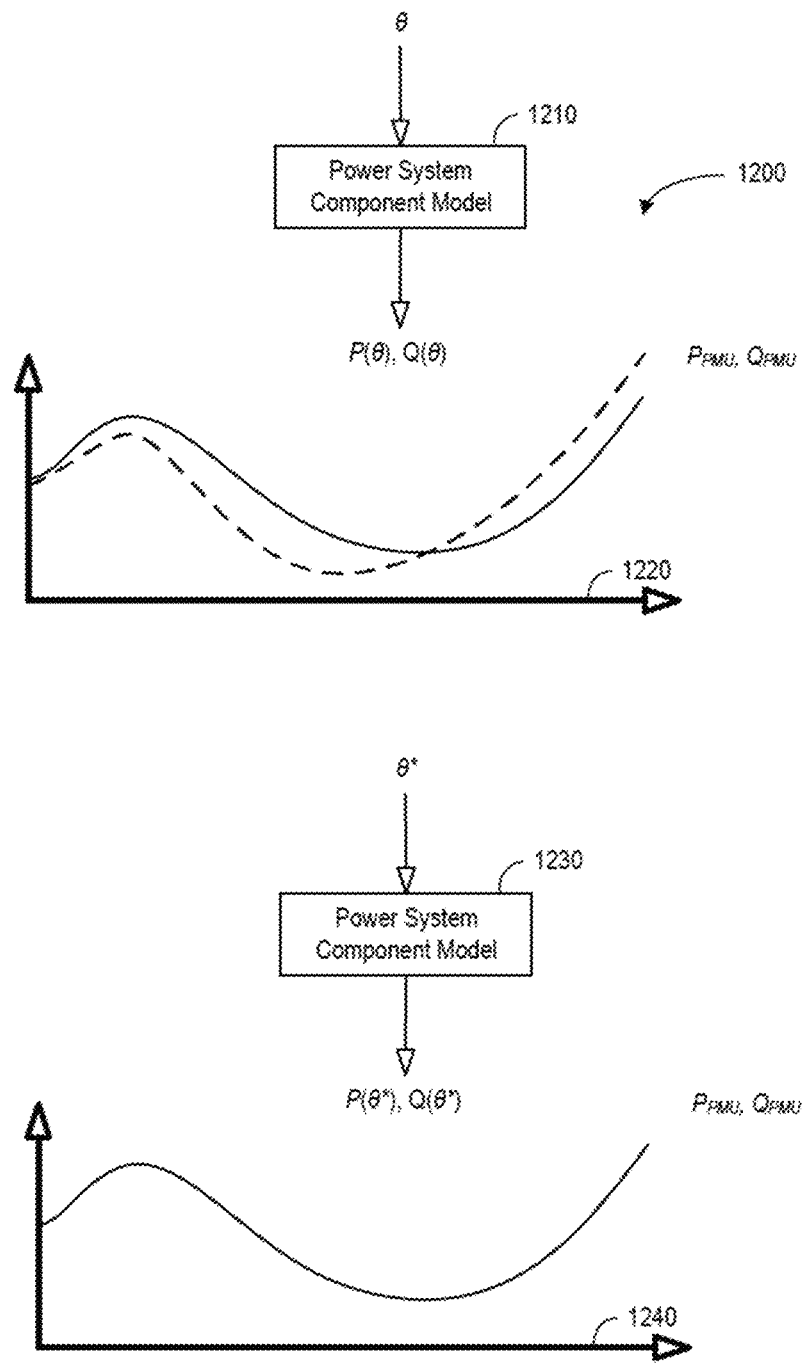
FIG. 12 illustrates model calibration algorithms in accordance with some embodiments.

FIG. 12 illustrates 1200 model calibration algorithms in accordance with some embodiments. In particular, a first power system component model 1210 may receive θ and generate P(θ), Q(θ) as illustrated by graph 1220 showing $P_{PMU}$, $Q_{PMU}$. A second power system component model 1230 may receive θ* and generate P(θ*), Q(θ*) as illustrated by graph 1240 showing $P_{PMU}$, $Q_{PMU}$. The system may utilize the following model:

$$\text{Model: } y(\theta) = \begin{bmatrix} P(\theta) \\ Q(\theta) \end{bmatrix}, \text{Measurement: } y^m = \begin{bmatrix} P_{PMU} \\ Q_{PMU} \end{bmatrix},$$

where, P(θ), Q(θ) are model outputs as a function of parameters θ and $P_{PMU}$ and $Q_{PMY}$ are time series PMU measurements. The goal of the model calibration may be to find θ* such that model output matches measurements: $y(\theta) \approx y^m$. According to some embodiments, a two-stage approach may include:

Stage 1 including a parameter identifiability analysis; and
Stage 2 including a parameter estimation.

Figure 13:
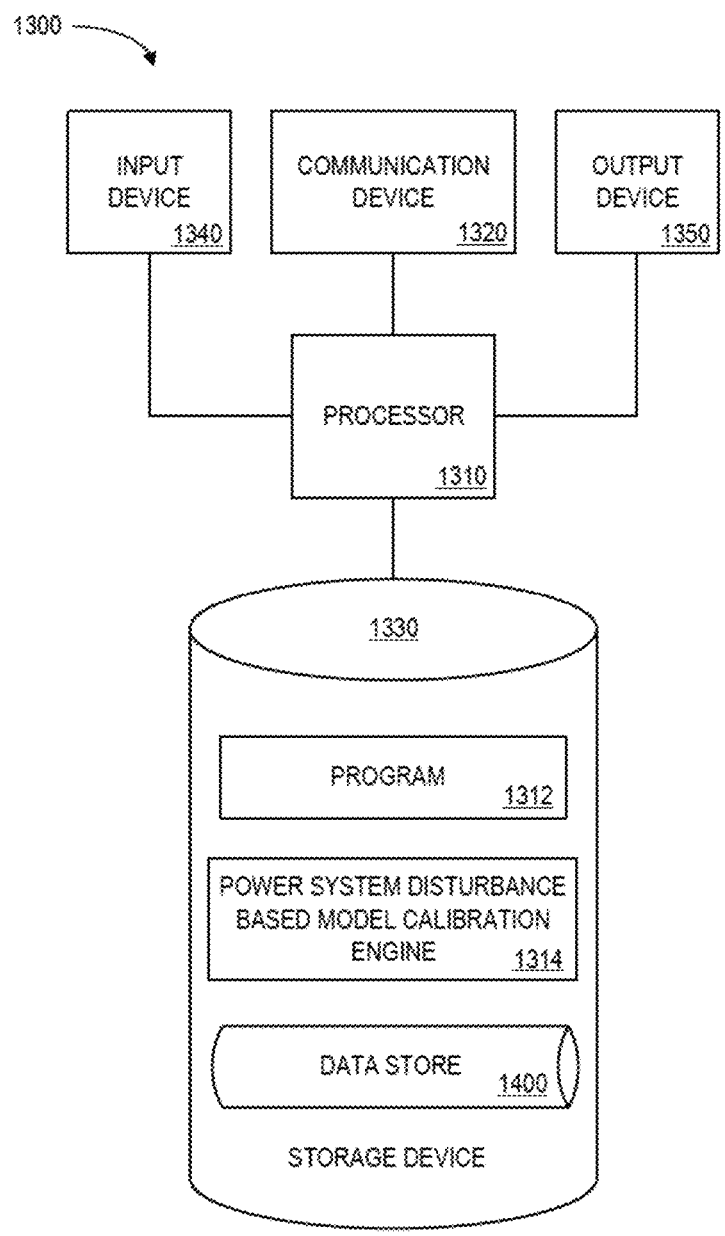
FIG. 13 is an apparatus or platform according to some embodiments.

Note that the embodiments described herein may also be implemented using any number of different hardware configurations. For example, FIG. 13 is a block diagram of an apparatus or platform 1300 that may be, for example, associated with the system 200 of FIG. 2 and/or any other system described herein. The platform 1300 comprises a processor 1310, such as one or more commercially available Central Processing Units ("CPUs") in the form of one-chip microprocessors, coupled to a communication device 1360 configured to communicate via a communication network (not shown in FIG. 13). The communication device 1360 may be used to communicate, for example, with one or more remote measurement units, components, user interfaces, etc. The platform 1300 further includes an input device 1340 (e.g., a computer mouse and/or keyboard to input power grid and/or modeling information) and/an output device 1350 (e.g., a computer monitor to render a display, provide alerts, transmit recommendations, and/or create reports). According to some embodiments, a mobile device, monitoring physical system, and/or PC may be used to exchange information with the platform 1300.

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1312 and/or a power system disturbance based model calibration engine 1314 for controlling the processor 1310. The processor 1310 performs instructions of the programs 1312, 1314, and thereby operates in accordance with any of the embodiments described herein. For example, the processor 1310 may calibrate a dynamic simulation engine, having system parameters, associated with a component of an electrical power system (e.g., a generator, wind turbine, etc.). The processor 1310 may receive, from a measurement data store, measurement data measured by an electrical power system measurement unit (e.g., a phasor measurement unit, digital fault recorder, or other means of measuring frequency, voltage, current, or power phasors). The processor 1310 may then pre-condition the measurement data and set-up an optimization problem based on a result of the pre-conditioning. The system parameters of the dynamic simulation engine may be determined by solving the optimization problem with an iterative method until at least one convergence criteria is met. According to some embodiments, solving the optimization problem includes a Jacobian approximation that does not call the dynamic simulation engine if an improvement of residual meets a pre-defined criteria.

The programs 1312, 1314 may be stored in a compressed, uncompiled and/or encrypted format. The programs 1312, 1314 may furthermore include other program elements, such as an operating system, clipboard application, a database management system, and/or device drivers used by the processor 1310 to interface with peripheral devices.

As used herein, information may be "received" by or "transmitted" to, for example: (i) the platform 1300 from another device; or (ii) a software application or module within the platform 1300 from another software application, module, or any other source.

In some embodiments (such as the one shown in FIG. 13), the storage device 1330 further stores data store 1400. An example of a database that may be used in connection with the platform 1300 will now be described in detail with respect to FIG. 14. Note that the database described herein is only one example, and additional and/or different information may be stored therein. Moreover, various databases might be split or combined in accordance with any of the embodiments described herein.

Referring to FIG. 14, a table is shown that represents the data store 1400 that may be stored at the platform 1300 according to some embodiments. The table may include, for example, entries identifying industrial assets or other systems to be protected. The table may also define fields 1402, 1404, 1406, 1408, 1410, 1412, 1414 for each of the entries. The fields 1402, 1404, 1406, 1408, 1410, 1412, 1414 may, according to some embodiments, specify: a component identifier 1402, a component description 1404, a dynamic simulation engine identifier 1406, PMU and DFR disturbance data 1408, pre-conditioned data 1410, an optimization problem 1412, and system parameters 1414. The data store 1400 may be created and updated, for example, when a new physical system is monitored or modeled, a component is to be calibrated, measurement data is received from a measurement unit, etc.

The component identifier 1402 might be a unique alphanumeric label that is associated with a particular portion of a power grid to be calibrated (e.g., a generator, wind turbine, solar panel, etc.) and the component description 1404 may describe the model, manufacture, specifications, etc. of the device. The dynamic simulation engine identifier 1406 may be associated with the model being calibrated and the PMU and DFR disturbance data 1408 may contain the raw data that will be analyzed and used to adjust model parameters. The pre-conditioned data 1410 may reflect, according to some embodiments, normalization of parameter and model output, an identifiability assessment providing sensitivity and dependency, and/or a feature transformation on model output data. The optimization problem 1412 may including sending model input and model parameters into the dynamic simulation engine and obtaining predicted model output for calculation of residual. The system parameters 1414 may reflect the model parameters that will be updated based on solution of the optimization problem.

Thus, some embodiments described herein may provide a unique optimization framework (objective function and solver) for power system model calibration using disturbance events. In the objective function, the feature transformation on model output measurement matrix may define the weighting for residual of individual output variables (P, Q). In the solver, the Jacobian might be only approximated when the improvement of residual is satisfactory. Moreover, a unique feature transformation based objective function may improve the quality of identified model parameters. The reuse of Jacobian data may reduce calculation time. Moreover, the generic optimization framework described herein may be compatible with a wide range of commercial simulation engines and customer locations (with minimal changes).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular power grid components, any of the embodiments described herein could be applied to other types of electrical power grid components (including dams, windfarms, batteries, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with an electrical power system, comprising:
  a dynamic simulation engine, having system parameters, of a component of the electrical power system;
  a measurement data store containing measurement data measured by an electrical power system measurement unit; and
  a model parameter tuning engine, including:
    a data connection to receive measurement data from the measurement data store,
    at least one model parameter tuning engine computer processor coupled to the data connection, and
    a computer memory coupled to the model parameter tuning engine computer processor and storing instructions that, when executed by the processor, cause the model parameter tuning engine to:
      receive a model calibration command,
      pre-condition the measurement data, including: a feature transformation on model output data, normalization of parameter and model output, and an identifiability assessment providing sensitivity and dependency,
      set-up an optimization problem, including a weight set-up on an objective function based on a feature transformation result, based on a result of the pre-conditioning, and
      determine the system parameters of the dynamic simulation engine by solving the optimization problem, including sending model input and model parameters into the dynamic simulation engine and obtaining predicted model output for calculation of residual, with an iterative method until at least one convergence criteria is met and solving the optimization problem includes a Jacobian approximation that;
        responsive to a determination that an improvement of residual does not meet a pre-defined criteria, calls the dynamic simulation engine, and
        responsive to a determination that an improvement of residual does meet a pre-defined criteria, does not call the dynamic simulation engine,
      wherein model parameters of an active power system model are automatically updated based on the solution of the optimization problem.

2. The system of claim 1, wherein the measurement data is associated with at least one of: (i) disturbance event data, and (ii) data from deliberately performed unit tests.

3. The system of claim 1, wherein the electrical component is associated with at least one of: (i) a generator, (ii) a wind turbine, (iii) a solar panel, and (iv) a dynamic load.

4. The system of claim 1, wherein the measurement unit is associated with at least one of: (i) a phasor measurement unit, (ii) a digital fault recorder, and (iii) other means of measuring frequency, voltage, current, or power phasors.

5. The system of claim 1, wherein the calibration command is received via an automated process.

6. The system of claim 1, wherein the calibration command is received via a user console interface display providing event data selection, simulation engine selection, and calibration algorithm configuration.

7. The system of claim 1, wherein the measurement data includes at least one of: (i) device terminal real power, (ii) reactive power, (iii) voltage magnitude, (iv) frequency, and (v) phase angle data.

8. The system of claim 1, wherein the model parameter tuning engine is associated with a graphical user interface display including validation information, identifiability information, and calibration information.

9. A computer-implemented method associated with an electrical power system, comprising:
  receiving, by a computer processor of a model parameter turning engine from a measurement data store, measurement data measured by an electrical power system measurement unit;
  receiving a model calibration command;
  pre-conditioning the measurement data, including: a feature transformation on model output data, normalization of parameter and model output, and an identifiability assessment providing sensitivity and dependency;
  setting-up an optimization problem, including a weight set-up on an objective function based on a feature transformation result, based on a result of the pre-conditioning;
  determining system parameters, of a dynamic simulation engine for a component of the electrical power system, by solving the optimization problem, including sending model input and model parameters into the dynamic simulation engine and obtaining predicted model output for calculation of residual, with an iterative method until at least one convergence criteria is met;

solving the optimization problem by:
  responsive to a determination that an improvement of residual does not meet a pre-defined criteria, calling the dynamic simulation engine by a Jacobian approximation, and
  responsive to a determination that an improvement of residual does meet a pre-defined criteria, not calling the dynamic simulation engine by the Jacobian approximation; and
automatically updating model parameters of an active power system model based on the solution of the optimization problem.

10. The method of claim 9, wherein the electrical component is associated with at least one of: (i) a generator, (ii) a wind turbine, (iii) a solar panel, and (iv) a dynamic load.

11. The method of claim 9, wherein the measurement unit is associated with at least one of: (i) a phasor measurement unit, (ii) a digital fault recorder, and (iii) other means of measuring frequency, voltage, current, or power phasors.

12. The method of claim 9, wherein the calibration command is received via an automated process.

13. The method of claim 9, wherein the calibration command is received via a user console interface display providing event data selection, simulation engine selection, and calibration algorithm configuration.

14. The method of claim 9, wherein the measurement data includes at least one of: (i) device terminal real power, (ii) reactive power, (iii) voltage magnitude, (iv) frequency, and (v) phase angle data.

15. A non-transitory, computer-readable medium storing program code, the program code executable by a computer processor to cause the processor to perform a method associated with an electrical power system, the method comprising:

receiving, by a computer processor of a model parameter turning engine from a measurement data store, measurement data measured by an electrical power system measurement unit;
receiving a model calibration command;
pre-conditioning the measurement data, including: a feature transformation on model output data, normalization of parameter and model output, and an identifiability assessment providing sensitivity and dependency;
setting-up an optimization problem, including a weight set-up on an objective function based on a feature transformation result, based on a result of the pre-conditioning; and
determining system parameters, of a dynamic simulation engine for a component of the electrical power system, by solving the optimization problem, including sending model input and model parameters into the dynamic simulation engine and obtaining predicted model output for calculation of residual, with an iterative method until at least one convergence criteria is met and solving the optimization problem by:
  responsive to a determination that an improvement of residual does not meet a pre-defined criteria, calling the dynamic simulation engine by a Jacobian approximation, and
  responsive to a determination that an improvement of residual does meet a pre-defined criteria, not calling the dynamic simulation engine by the Jacobian approximation; and
automatically updating model parameters of an active power system model based on the solution of the optimization problem.

* * * * *